(12) United States Patent
Morris, III et al.

(10) Patent No.: US 7,281,384 B2
(45) Date of Patent: Oct. 16, 2007

(54) POULTRY CHILLER WITH IMPROVED PRODUCT DISTRIBUTION AND ANTIBACTERIAL COUNT

(75) Inventors: William F. Morris, III, Raleigh, NC (US); Terry A. Wright, Cary, NC (US); John P. Shell, Raleigh, NC (US); Robert E. Cathey, Hendersonville, NC (US)

(73) Assignee: Morris & Associates, Inc., Garner, NC (US)

( * ) Notice: Subject to any disclaimer, the term of this patent is extended or adjusted under 35 U.S.C. 154(b) by 199 days.

(21) Appl. No.: 11/217,159

(22) Filed: Sep. 1, 2005

(65) Prior Publication Data

US 2006/0225439 A1    Oct. 12, 2006

Related U.S. Application Data

(63) Continuation-in-part of application No. 11/100,802, filed on Apr. 7, 2005, now Pat. No. 7,174,724.

(51) Int. Cl.
*F25D 17/02* (2006.01)

(52) U.S. Cl. .............................. 62/64; 62/375; 165/92; 452/197

(58) Field of Classification Search ............... 62/63, 62/64, 266, 310, 374–376, 381; 165/87, 165/92, 104.31, 109.1; 134/159; 452/81, 452/197; 198/952
See application file for complete search history.

(56) References Cited

U.S. PATENT DOCUMENTS

| | | | |
|---|---|---|---|
| 2,942,429 A | 6/1960 | Van Dolah et al. | 62/64 |
| 3,004,407 A | 10/1961 | Morris, Jr. | 62/374 |
| 3,091,099 A | 5/1963 | Sharp | 62/376 |
| 3,092,975 A | 6/1963 | Zebarth | 62/63 |
| 3,097,501 A | 7/1963 | Pappas | 62/63 |
| 3,164,967 A | 1/1965 | Marshall | 62/63 |
| 3,240,026 A | 3/1966 | Van Dolah et al. | 62/63 |
| 3,340,696 A | 9/1967 | Zebarth et al. | 62/63 |
| 3,407,872 A | 10/1968 | Crane | 165/109 |
| 3,426,546 A | 2/1969 | Crane | 62/63 |
| 3,623,331 A | 11/1971 | Buyens | 62/63 |
| 3,906,743 A * | 9/1975 | Schorsch et al. | 62/374 |
| 3,994,143 A | 11/1976 | Bonuchi et al. | 62/317 |
| 4,138,860 A | 2/1979 | Drummond | 62/375 |
| 4,277,954 A | 7/1981 | Drummond | 62/375 |
| 4,569,204 A * | 2/1986 | Ott et al. | 62/63 |
| 4,860,554 A * | 8/1989 | Innes et al. | 62/374 |
| 5,456,091 A * | 10/1995 | Zittel | 62/375 |

(Continued)

FOREIGN PATENT DOCUMENTS

WO    WO99/30142    * 6/1999

*Primary Examiner*—Mohammad M. Ali
(74) *Attorney, Agent, or Firm*—Thomas, Kayden, Horstemeyer & Risley, LLP

(57) ABSTRACT

Birds are moved through chilled water by bird moving means such as an auger or by a series of paddles. The birds tend to accumulate in a predetermined path in the water. Streams of water that include an antibacterial additive are directed toward the predetermined path and engage and disperse the birds, and wash the birds with the streams of water and the antibacterial additive, thereby increasing the rate of heat transfer from the birds and increasing the effectiveness of the antibacterial properties of the agents in the chilled water.

19 Claims, 6 Drawing Sheets

U.S. PATENT DOCUMENTS

| | | |
|---|---|---|
| 5,868,000 A | 2/1999 | Morris, Jr. et al. ............ 62/374 |
| 6,167,709 B1 | 1/2001 | Caracciolo, Jr. et al. ......... 62/64 |
| 6,308,529 B1 | 10/2001 | Bass .............................. 62/63 |
| 6,397,622 B1 * | 6/2002 | Miller et al. ................... 62/381 |
| 6,865,895 B2 * | 3/2005 | Bass .............................. 62/64 |
| 6,951,273 B2 * | 10/2005 | Bass ........................... 198/657 |
| 2001/0025495 A1 | 10/2001 | Newman et al. ................ 62/63 |
| 2005/0048174 A1 * | 3/2005 | Marckini et al. ............ 426/321 |

* cited by examiner

POULTRY CHILLER WITH IMPROVED PRODUCT DISTRIBUTION AND ANTIBACTERIAL COUNT

CROSS REFERENCE

This is a continuation-in-part of U.S. patent application Ser. No. 11/100,802, filed Apr. 7, 2005, now U.S. Pat. No. 7,174,724.

FIELD OF THE INVENTION

This invention involves chillers for reducing the temperature and bacterial count of animals, particularly birds that have been eviscerated and otherwise prepared for human consumption. More particularly, the invention concerns a process of advancing birds through chilled water containing an anti-bacterial additive and exposing the birds in the water to intimate and vigorous contact with the anti-bacterial water.

BACKGROUND OF THE INVENTION

Food chillers, such as auger and drag type poultry chillers, are used in processing plants for reducing the temperature of the birds after the birds have come off the processing line and have been defeathered, eviscerated and otherwise have been made oven-ready, for packaging and shipment to the consumers.

The chillers in use at this time generally are the auger chiller and the drag chiller. A typical auger type poultry chiller includes an elongated, half-cylindrical tank having a rotary auger placed therein. Water is placed in the tank and is recirculated through a cooling system such as a refrigeration system, with the water directed to a first end of the tank and reclaimed at a second end of the tank. Birds are placed in the tank at its second end and the birds are advanced by rotation of the auger toward the first end and are removed from the tank at its first end. The auger typically rotates at one revolution for every two to five minutes. This arrangement moves the water in a counter flow relationship with respect to the movement of the birds, so that the coldest water at the bird delivery end of the tank contacts the birds.

This type of poultry chiller is generally known in the prior art, as exemplified by U.S. Pat. Nos. 5,868,000 and 6,308,529.

One of the phenomena of the prior art auger chillers is that the birds tend to migrate from one lateral side of the auger shaft (the "dead" side of the tank) to the other lateral side of the auger shaft (the "pulling" side of the tank) as the birds advance along the length of the tank. The conditions that cause this phenomena are that as the water in the tank moves along the length of the tank a large percentage of the water flows about the perimeter of the auger blades, between the edges of the blades and the sides of the tank. The birds in the water tend to follow the water toward the perimeter of the auger blades and into contact with the auger blades. When the birds contact the auger blades the rotary motion of the auger blades urges the birds from the "dead" side to the "pulling" side of the tank. The auger blades move in an arcuate path first downwardly into the water through the dead side of the tank, then beneath the auger shaft, and then upwardly on the pulling side of the auger shaft and then out of the water in the tank. The birds tend to follow this movement to the pulling side of the tank until the blades reach the surface of the water at the pulling side of the tank. Then the buoyancy of the birds and the movement of the water between the perimeter of the auger blades and the side of the tank tend to hold the birds there. This usually results in most of the birds at each auger flight forming a mass or "clump" of birds on the pulling side of the tank, at the side wall of the tank, at the surface of the water.

This accumulation of birds in a relatively dense mass on the crowded pulling side of the auger shaft tends to reduce the chilling effect of the water against the birds. The birds in the mass are so densely packed next to one another compared to the surrounding water that the chilling capacity of the water about the mass of birds is substantially reduced.

Another effect of the massing of the birds as described above is that there is less circulation of the water among the birds. It is well known that the rapid circulation of chilled water about the birds results in a more rapid removal of heat from the birds.

The water level in the prior art auger chiller tanks usually is maintained at or only slightly higher than the height of the shaft of the auger. The shaft functions as a dam to prevent the birds in the mass of birds on the pulling side of the tank from moving across the shaft into the space behind the auger flight.

In order to increase the load capacity of a poultry chiller, additional water can be added to the tank. FIG. 1 of the drawings shows a prior art poultry chiller that is filled with water to a level above the auger shaft. The chiller tank 10 is a one-half cylinder tank that has a lower portion 12 in the form of a one-half cylinder and vertical wall extensions 14 and 15. The water level is shown at 21. The helical auger blade 16 in the tank is rotated on its auger shaft 18 in the direction as indicated by arrow 20, inducing the birds 102 to move laterally from the dead side 24, beneath the auger shaft 18, to the pulling side 25 of the chiller tank 10. In this example the water level 21 is higher than the shaft 18. When the birds move to a level in the water adjacent the side wall of the tank that is higher than the auger shaft 18, those birds adjacent the side wall of the tank eventually reach an approximately triangular shaped gap 26 where the vertical extension 15 of the one-half cylinder tank 12 diverges from the circular perimeter of the helical auger blade 16. The water moving through the gap induces any birds that are suspended near the water level 21 and adjacent the vertical wall extension to move from the pulling flight to the following flight of the auger. This results in some of the birds falling behind by one auger flight and spending a longer time than necessary in the tank.

As shown in FIGS. 2 and 3, a solution to the loss of birds from one auger flight to the following auger flight in a high water situation through a triangular shaped gap, such as the gap 26 of FIG. 1, was to eliminate the triangular gap. This was accomplished by making the one-half cylinder chiller tank more nearly a full cylindrical shape, as shown by the tank 32. The vertical wall extensions of FIG. 1 were wrapped about the auger. But if high water is used in the chiller tank of FIG. 2 as shown by water level 31, there is a hazard that some of the birds 102 that accumulate on the pulling side of the tank will float over the auger shaft 28. If birds should inadvertently cross over the auger shaft 28 by the over-filling of the tank with water and by the accumulation of too many birds on the pulling side of the tank, the birds crossing the shaft will fall behind in the next flight of the auger. This is illustrated in FIG. 3 where the solid lines of the auger 33 illustrate the upper portions of auger positioned above the water level and the dashed lines of the auger 33 illustrate the lower portions of the auger positioned below the water level. The birds 22A, 22B, and 22C have moved away from their mass of birds 23 and crossed over the auger shaft 28. Once the bird shown at 22A crosses the auger shaft it enters the dead side of the tank, and the contact of the downwardly moving surface of the auger against the bird on the dead side of the tank tends to move the bird from position 22A toward 22B and eventually under the auger shaft 28 to position 22C. This results in the birds falling behind to the next accumulation of birds and the birds remain in the chiller an additional 2 to 5 minutes, which is longer than the time required for chilling the bird. It also places extra birds in the following auger flight so that the chilling efficiency of the following auger flight tends to be reduced.

In order to reduce the bacterial count of the birds as the birds are moved through a processing plant, an antibacterial additive has been added to the water in the prior art chiller tanks. But another problem with the accumulation of birds in a small area or clump of the auger driven chiller as the birds progress through the chiller is that the water of the tank, including the antibacterial additive, does not have the opportunity to make intimate and vigorous contact with all of the birds. This not only reduces the rate of heat removal from the birds but also reduces the effect of the antibacterial additive on the birds, so that the bacterial count of the birds exiting the chiller may not be as low as desired.

Another problem with some of the prior art chillers with antibacterial delivery systems is that they typically deliver the agent to one area of the chiller and count on the water movement to disperse the agent throughout the chiller. The effectiveness of the agents decreases with the length of exposure to the birds so agents delivered to the first end of the chiller tank and removed at the second end of the chiller tank are not as effective as a system delivering fresh antibacterial agents throughout the chiller thank.

The regulations for the addition of chlorine to the red water in chillers require not more than five (5) parts free chlorine per one million (1,000,000) parts water. However, the regulations allow up to fifty (50) PPM chlorine to water when the chlorine is added to the fresh make-up water, which can then be directed to the intake of the invention.

Another problem in the birds falling behind to a following auger flight in a prior art bird chiller is created when the entire poultry processing line is progressively shut down for a work break. The delivery of birds to the chiller is interrupted for a certain time interval, such as 18 minutes, so the birds previously delivered to the chiller can move on through the chiller but the absence of incoming birds creates a gap in the line of birds to be processed by the following work stations. When the last birds are removed from the tank the following process stations have no birds to process and the workers at the following work stations have the opportunity to take a work break.

However, if the birds in the chiller have fallen behind to the next auger segment, the birds will continue to be delivered from the chiller to the following work stations for a longer time, 2 to 5 minutes, so that the workers down stream from the chiller do not have as much time on their work break. Even when the operation of the chiller is not interrupted for a work break, the non-uniform delivery of birds from the chiller may reduce the efficiency of the following processing line.

Another type poultry chiller is the drag type chiller that does not use an auger to advance the birds through the water of the chiller, but uses a series of drag paddles to advance the birds. A typical drag type poultry chiller includes a tank that is elongated, open-topped and substantially rectangular in cross section and has a series of paddles that conform to the cross sectional shape of the tank. The paddles are placed within the tank and are driven by a motor and chain along the length of the tank to advance the birds through the chilled water of the tank. Like the auger chiller, the water in the tank of the drag chiller is recirculated through a cooling system such as a refrigeration system, with the water directed to a first end of the tank and reclaimed at a second end of the tank. The birds are placed in the tank at its second end and the birds are advanced by the moving paddles toward the first end and are removed from the tank at its first end. The paddles typically move a distance along the tank of one-half to one foot per minute. This arrangement moves the water in a counter flow relationship with respect to the movement of the birds, so that the coldest water at the delivery end of the tank contacts the birds.

This type of poultry chiller is generally known in the prior art, as shown by U.S. Pat. No. 3,004,407.

In order to increase the circulation of the chilled water among the birds in a drag chiller, the paddles in some of the drag chillers are formed of a spaced plurality of parallel bars that are close to one another to avoid the inadvertent movement of the birds between the bars, but spaced far enough apart to allow the water to pass between the bars.

One of the phenomena of the prior art drag poultry chillers is that the birds tend to accumulate against the forward face of the paddle. The conditions that cause this phenomena is that as the counter flow water in the tank moves along the length of the tank in the opposite direction of the moving paddles the birds are moved by the water against the paddles. This usually results in most of the birds at each paddle forming a mass or "clump" of birds on the front side of the paddle. The clump may be in the form of a layer of the birds accumulated on the face of the paddle, and/or a mass of birds that have a first layer of the birds in the mass directly engaging the on-coming paddle and other birds engaging the first layer of birds. This leaves a void or empty space between the clump of birds and the preceding paddle, thus resulting in an inefficient use of the volume of the chiller water that is displaced from the clump of birds.

This accumulation of birds in a relatively dense mass on the front side of the paddle tends to reduce the chilling effect of the water against the birds. The birds in the mass are so densely packed next to one another compared to the surrounding water that the chilling capacity of the water in the mass of birds is substantially reduced.

Another effect of the massing of the birds as described above is that there is less circulation of the water among the birds. As stated above, it is well known that the rapid circulation of chilled water about the birds results in a more rapid removal of heat from the birds.

The drag chiller has the same problems as the auger chiller in that the accumulation of birds in a small area or clump as the birds progress through the chiller and the water of the tank does not have the opportunity to make intimate and vigorous contact with all of the birds. This reduces the rate of heat removal from some of the birds and also reduces the effect of the antibacterial additive on the birds, so that the bacterial count of the birds exiting the chiller may not be as low as desired.

It is to the above noted problems that this invention is directed.

SUMMARY OF THE INVENTION

Briefly described, the present invention comprises an improved poultry chiller for efficiently reducing the temperature of birds and reducing the bacterial count of the birds that have been processed for human consumption. The chiller has an auger or paddles that function as bird moving means that move the birds along a predetermined path. Water jets direct submerged streams of chilled water bearing an antibacterial additive into the path and against the massed birds to disperse the birds. The streams urge the birds to disengage from the piles or densely clumped areas of the birds in the chiller and to move the birds to other areas of the chiller where the birds are not densely gathered, with the antibacterial of the stream of water vigorously contacting the birds. Thus, the chiller can handle more birds by the increased rate of temperature transfer from the birds.

In an auger chiller the invention tends to reduce the extensive accumulation of birds on the pulling side of the auger chiller tank that has the hazard of causing bird cross-over from one flight of the auger to the trailing flight of the auger. The invention provides tighter control of chilling time for each bird and better management of feed rate to downstream processing, and achieves a reduced bacterial count of the birds delivered by the chiller.

The invention also tends to reduce the extensive accumulation of birds from the front of the paddles in a drag chiller, reducing temperatures and increasing the antibacterial properties of the system.

The streams of water that are used to redistribute and tumble the birds may include make-up water that contains up to 50 PPM free chlorine to water and/or recirculated red water with total free chlorine not to exceed 5 PPM free chlorine. This causes the birds to be washed with water having the maximum content of chlorine, delivered throughout the chiller, resulting in a lower bacterial count of the birds that have passed through the chiller.

An embodiment of the auger chiller that includes the invention described herein is similar to the prior art auger chiller described above in that it includes an elongated, more than one-half cylindrical tank, an auger in the tank, the auger having an auger shaft parallel to the length of the tank and a helical auger blade having auger flights extending about the auger shaft. When the tank is filled with water and birds are placed in the water and the auger is rotated and the helical surface of each auger flight moves in an arcuate path through the water, first downwardly on the dead side of the auger shaft, then laterally beneath the auger shaft and then upwardly on the pulling side of said auger shaft. This tends to advance and lift the buoyant birds in the water along the elongated tank such that most of the birds tend to move laterally beneath the auger shaft from the dead side of the auger shaft to the pulling side of the auger shaft and tend to accumulate in masses of buoyant birds that move along the tank at the surface of the water on the pulling side of said auger shaft.

In order to avoid the excessive accumulation of birds on the pulling side of the tank of the prior art auger chillers, nozzles are positioned at the side wall of the tank on the pulling side of the auger shaft and are oriented for moving streams of water laterally into the water in the tank. The streams of water are directed from the pulling side of the tank, below the auger shaft, generally parallel to the surfaces of the auger, and toward the dead side of the tank. The streams of water tend to engage and move the birds away from the pulling side of the tank and tend to remove some of the birds from the masses of buoyant birds on the pulling side of the tank, by moving the birds below the auger shaft and toward the dead side of the tank. This spreads the birds toward the dead side of the tank where there are fewer birds, thereby increasing the rate of cooling of the birds on both sides of the tank.

The tank of the chiller is more than half cylindrical so as to have its cylindrical shape continue partially around the upper half of the auger. This avoids the creation of the triangular shaped gaps 26 between the flights of the auger and the side of the tank as shown in FIG. 1, and allows the level of water in the tank to be raised. The additional volume of water in the tank allows more birds to be processed through the tank without increasing the footprint of the tank.

The reduction of the accumulation of masses of the birds on one side of the auger spreads the birds from one another and increases the rate of heat transfer from the birds, and allows more birds to be accommodated in the chiller. This also allows the water level to be raised without increased hazard of the birds moving over the auger shaft, thereby allowing even more birds to be accommodated in the chiller.

Another feature of the invention is that an antibacterial substance is added to the streams of water that move and tumble the birds. The streams of water tend to vigorously engage and tumble and wash the birds with the antibacterial substance so that the bacterial count on the birds is controlled.

An embodiment of the drag chiller as generally described above includes an elongated, open-topped rectangular tank having a series of paddles that are placed within and driven by a motor and chain. Water is placed in the tank and is recirculated through a cooling system such as a refrigeration system, with the water directed to a first end of the tank and reclaimed at a second end of the tank. Birds are placed in the tank at its second end and the birds are advanced by the moving paddles toward the first end and are removed from the tank at its first end. The paddles typically move one-half to one foot per minute. This arrangement moves the water in a counter flow relationship with respect to the movement of the paddles and birds, so that the coldest water at the delivery end of the tank contacts the birds.

In this embodiment of the invention, the paddles are in the form of an open mesh, such as a plurality of parallel, spaced bars that move the birds in one direction and allow the water to flow between the bars in a counter flow relationship with the birds. The relative movement of the water toward the paddles tends to move the birds into engagement with the paddles to accumulate against the front or driving side of the paddles and leaves a void space between the leading edge of the bird pile and the rear of the preceding paddle.

In order to avoid the excessive accumulation of birds on the front side of the paddles, nozzles are positioned at the lower side walls of the tank and are oriented for moving streams of water upward and forward, sloped in the direction of movement of the paddles, but sloped opposite to the direction of movement of the water through the tank. The streams of water tend to move the birds away from the front side of the paddles and tend to remove some of the birds from the masses of buoyant birds clumped on the front side of the paddle by moving the birds forward into the less densely packed space behind the preceding paddle. This tends to spread the birds toward the preceding paddles where there are fewer birds, thereby increasing the rate of cooling and increasing the antibacterial properties of the agents added to the chilling water.

The reduction of the accumulation of masses of the birds on the front side of the paddles spreads the birds from one another and increases the rate of heat transfer from the birds, and allows more birds to be accommodated in the chiller.

Another feature of the drag chiller is that an antibacterial agent is added to the streams of water and the streams of water tend to vigorously tumble and wash the birds with the antibacterial additives in the chilling water so that the bacterial count on the birds is better controlled. Antibacterial agents can be added directly to the water before the water passes through the nozzles for delivering optimum concentration of antibacterial agents throughout the chiller and further increasing the effectiveness of the agents.

Thus, it is an object of this invention to reduce the bacterial count of the birds delivered from a chiller Another object of this invention to provide a auger-type chiller for dressed poultry products with improved bird distribution in the chiller tank, for increasing the rate of heat transfer from the birds while reducing the hazard of crossover of the birds from one auger flight to the following auger flight, and for reducing the bacterial count of the birds delivered from the chiller.

Another object of this invention is to provide a drag chiller for dressed poultry products with improved bird distribution in the chiller tank, and for reducing the bacterial count of the birds delivered from the chiller.

Another object of this invention is to provide a more efficient chiller for oven-ready birds, that has an increased production capacity for treating the products without enlarging the footprint of the chiller in the work space.

Other objects, features and advantages of the present invention will become apparent upon reading the following specification, when taken in conjunction with the accompanying drawings.

DETAILED DESCRIPTION OF PREFERRED EMBODIMENTS

Figure 5:
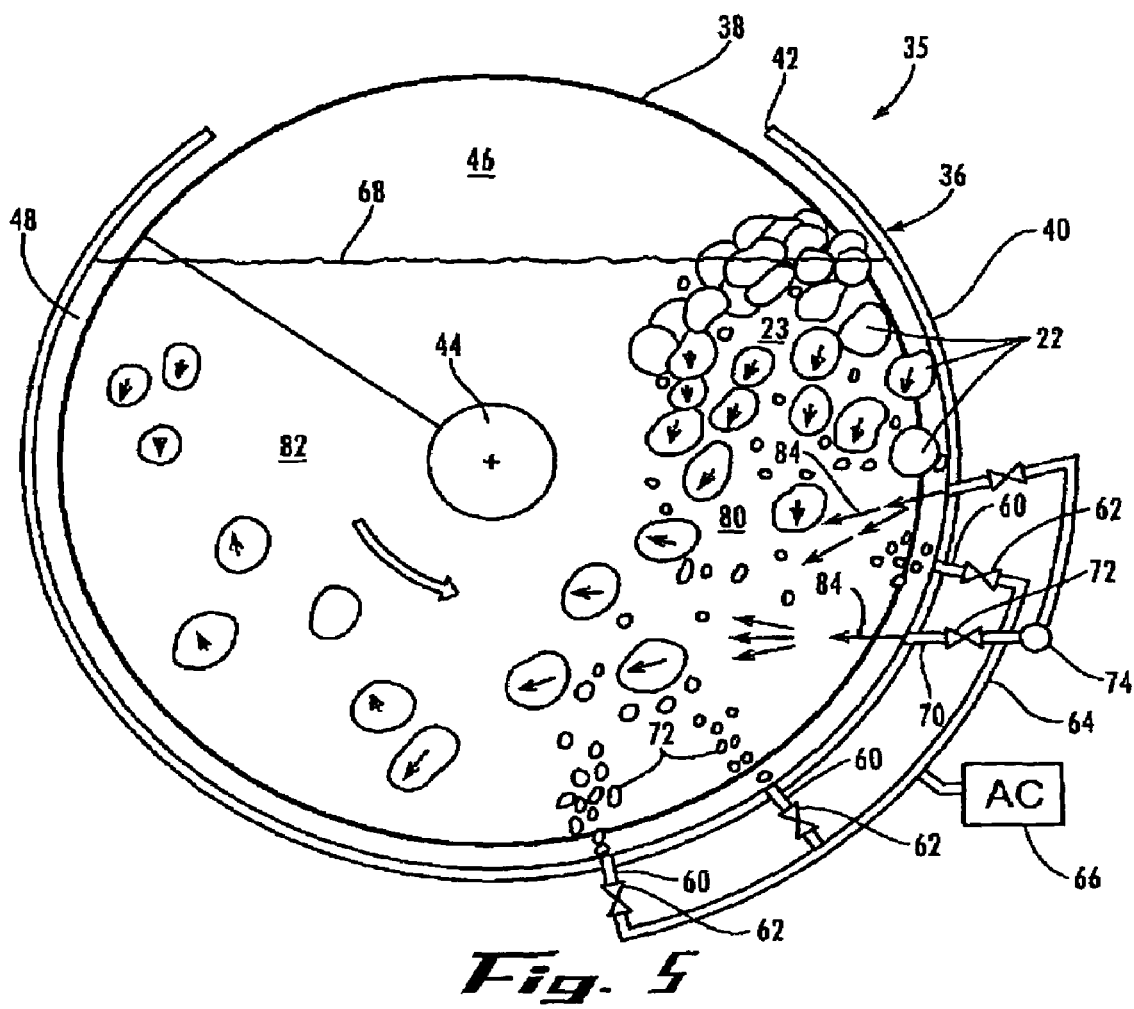
FIG. 5 is an end cross-sectional view of the chiller with improved bird distribution.
Figure 4:
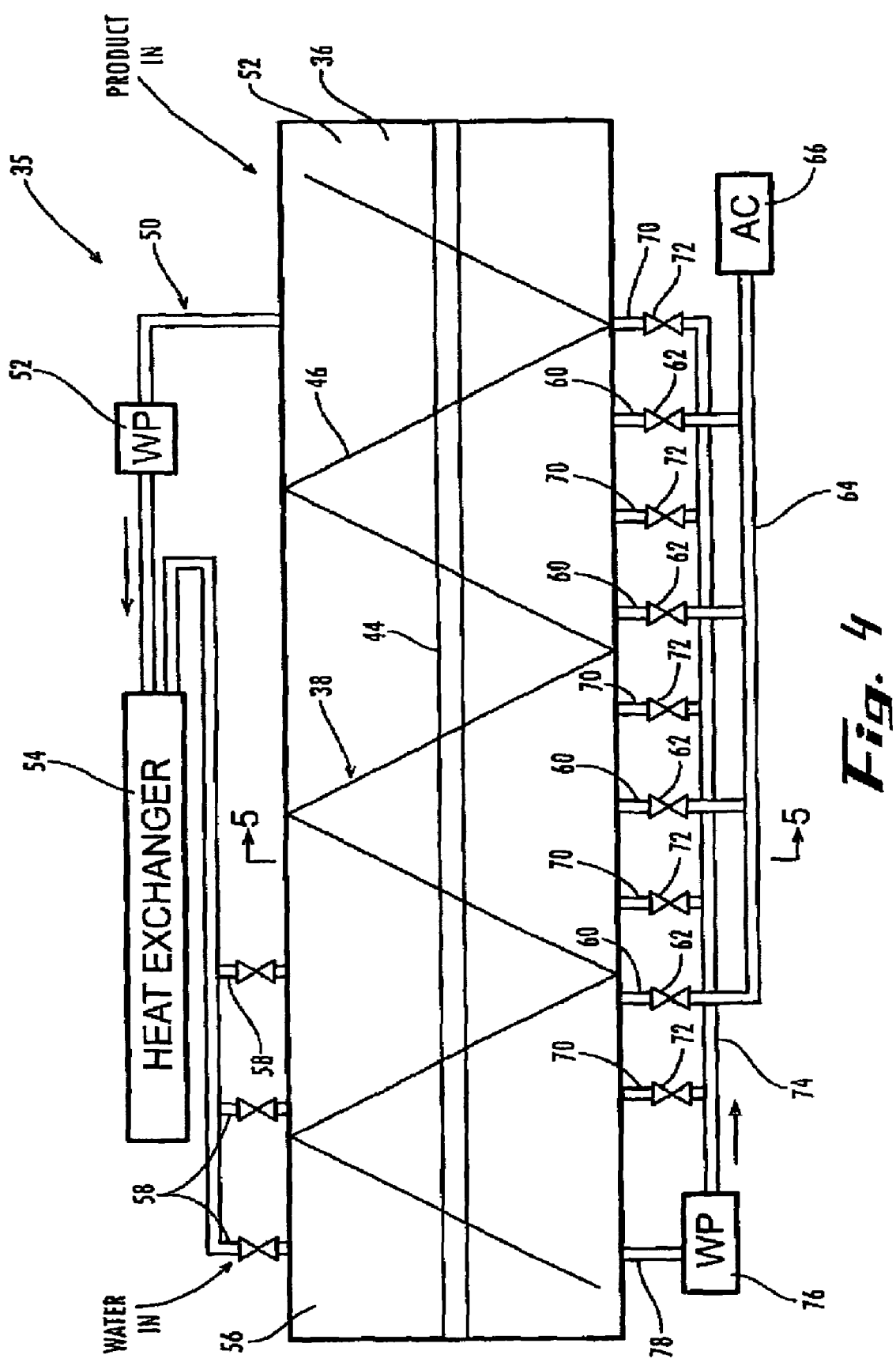
FIG. 4 is a plan view of an auger chiller with improved bird distribution.

Referring now in more detail to the drawings, in which like numerals indicate like parts throughout the several views, FIGS. 4 and 5 illustrate an auger type poultry chiller 35 having an elongated tank 36 and an auger 38 in the tank. The tank has a semi-cylindrical side wall 40 that has an opening 42 at its upper portion. In the embodiment shown, the semi-cylindrical side wall extends approximately 290° about the auger 38, with the tank opening 42 extending the remaining approximately 70°. Other degrees of tank extensions about the auger may be used as may be desired.

The helical auger 38 is centrally located within the semi-cylindrical side wall 40 with the auger shaft 44 being substantially coextensive with respect to the center line of the semi-cylindrical side wall 40 of the tank. The auger includes a helical blade 46 formed in several flights (not shown) that are supported by and surround auger shaft 44, with the auger blade extending out closely adjacent the semi-cylindrical side wall 40 of the tank 36. The gap 48 between the perimeter of the helical auger blade 46 and the facing surface of the semi-cylindrical side wall 40 of the tank is substantially less than the breadth of a typical bird 102 that is to be processed by the poultry chiller 35. This prevents the birds from passing between the perimeter of the helical auger blade and the facing surface of the semi-cylindrical side wall 40. However, the gap 48 allows water to pass about the perimeter of the auger blade, between the perimeter and the side wall of the tank. It is also possible to construct the auger blades so that water passages are formed in the blades that extend radially from adjacent the auger shaft to the perimeter of the blade. This is disclosed in U.S. Pat. No. 6,308,529, the disclosure of which is incorporated herein in its entirety by reference.

As shown in FIG. 4, the tank 36 contains water that is continuously recirculated through a recirculation system 50. A water pump 52 removes water from the product inlet end, moves the water through a heat exchanger 54 that reduces the temperature of the water, and then introduces the chilled water at the water inlet end 56. Usually, several inlet conduits 58 are used to introduce the rechilled water into the tank 36.

Helical auger 38 may be formed in several flights (not shown) so as to accommodate supports for the auger shaft. This is illustrated in U.S. Pat. No. 6,722,490, which is incorporated herein in its entirety by reference. The auger typically rotates at one revolution per three to five minutes, in a direction that moves the bird from the product inlet end 52 toward the opposite end 56, while the water is moved into the water inlet end 56 and migrates toward the end 52. This counter flow relationship results in the coldest water making initial contact with the birds that have already been pre-chilled by movement along the poultry chiller.

In order to enhance the contact of the chilled water with the surfaces of the birds 102, air nozzles 60 may be mounted to the semi-cylindrical side wall 40 of the tank 36. The nozzles 60 communicate through control valves 62 with an air conduit 64. An air compressor 66 provides air under pressure to the air conduit, through the control valves, to the air nozzles 60. When the tank 36 is filled with water to the water level 68, the infusion of air through the air nozzles 60 into the water generates rapidly rising air bubbles 72. The air nozzles 60 are located in the lower portion of the semi-cylindrical side wall 40 of the tank 36, on the pulling side of auger shaft 44 where the birds 102 tend to accumulate. The bubbles of water tend to disturb the birds 102, and to create turbulence in the water about the birds, therefore enhancing the rate of heat transfer between the birds and the water.

The air nozzles 60 communicate through the semi-cylindrical side wall 40 of the tank of the chiller 35 at intervals along the length of the tank (FIG. 4), and also are radially spaced about the lower quadrant of the tank (FIG. 5). This assures that the circulation of water among the birds that have accumulated in a mass of birds is maintained. Each nozzle may have its own control valve 62.

Figure 6:
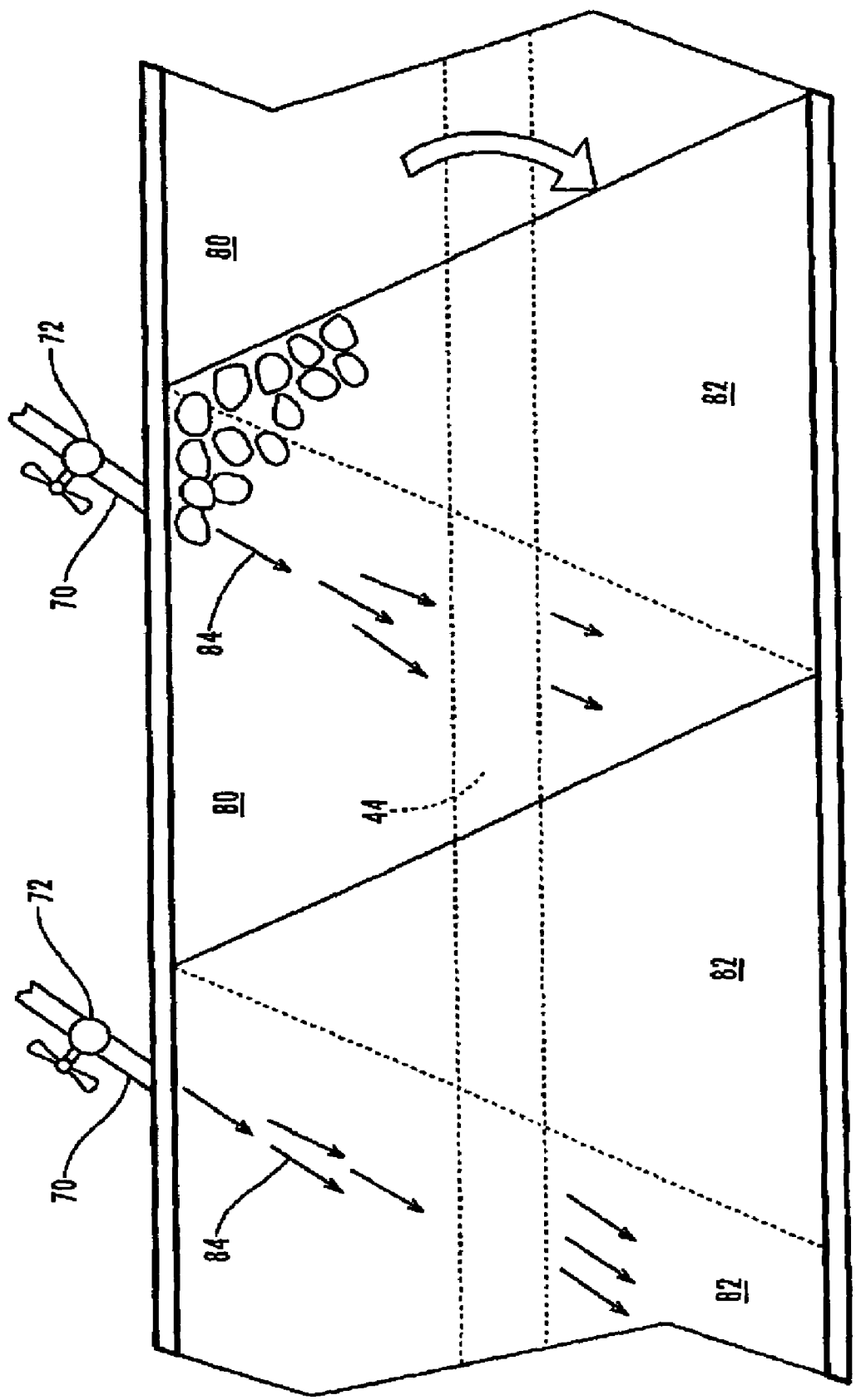
FIG. 6 is a plan view of a portion of the chiller tank and auger of FIG. 4, showing the direction of the water streams emitted from the nozzles at the pulling side of the tank.

Water nozzles 70 also communicate through the semi-cylindrical side wall 40 of the tank of the chiller 35. As shown in FIGS. 4 and 6, the water nozzles are spaced along the length of the tank 36, and each nozzle may include its own control valve 72 that communicates with a header 74. A water pump 76 is connected by inlet pipe 78 to the tank 36 at the cold water end of the tank. The water pump moves water from the cold end of the tank to each of the nozzles 70, and as shown in FIGS. 5 and 6, the nozzles in turn inject water in streams 84 laterally through the tank from the more crowded pulling side of the tank 80, beneath the auger shaft 44, to the more vacant dead side of the tank 82. The nozzles 70 are also spaced at intervals along the length of the tank 36 SO that there will be several streams of water injected into the tank to move the birds. The nozzles direct the streams of water 84 parallel to the auger blades, as shown in FIG. 6, and beneath the auger shaft 44, as shown in FIG. 5, and the streams tend to follow the curvature of the bottom of the tank until dissipated beyond the auger shaft, moving the birds in the same general directions. In the meantime, the air bubbles 72 move upwardly about the streams of water.

As the birds are advanced along the tank by the auger flights they are moved into alignment with the nozzles so that the masses of birds of each flight on the pulling side of the chiller tank are contacted by the streams of water emitted from the nozzles and the stream of water 84 from each nozzle 70 tends to impinge against the masses of buoyant birds that may have accumulated on the crowded side of the tank. This tends to disperse the birds from the masses and urges the birds laterally beneath the auger shaft 44 toward the vacant side of the tank 82.

Figure 1:
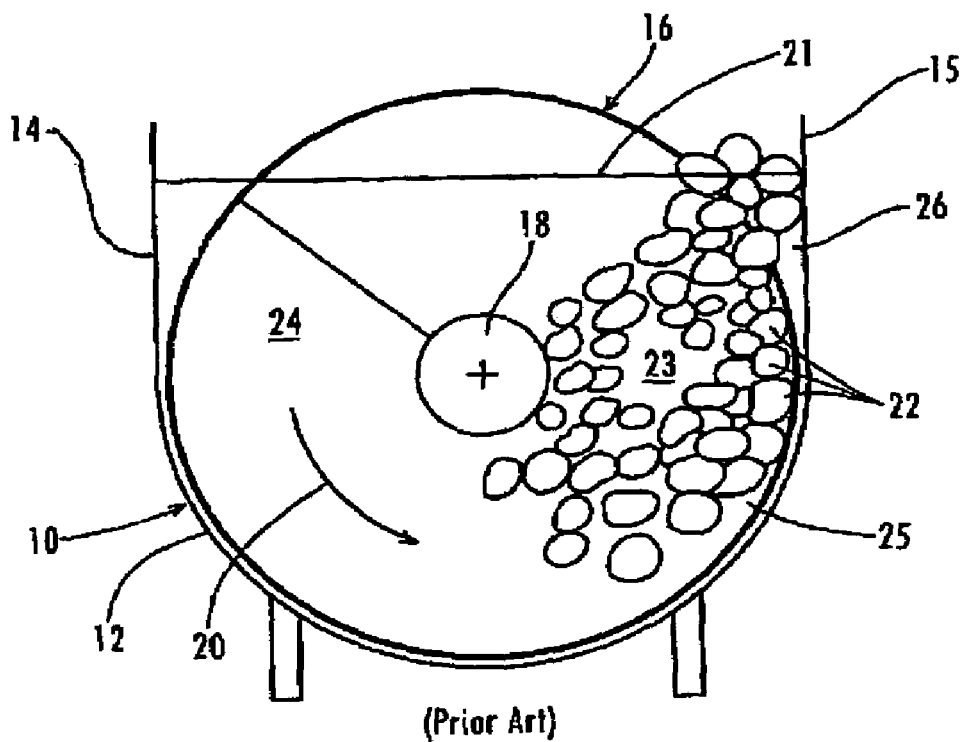
FIG. 1 is an end cross-sectional view of a prior art auger-type poultry chiller, showing a one-half cylinder tank.
Figure 2:
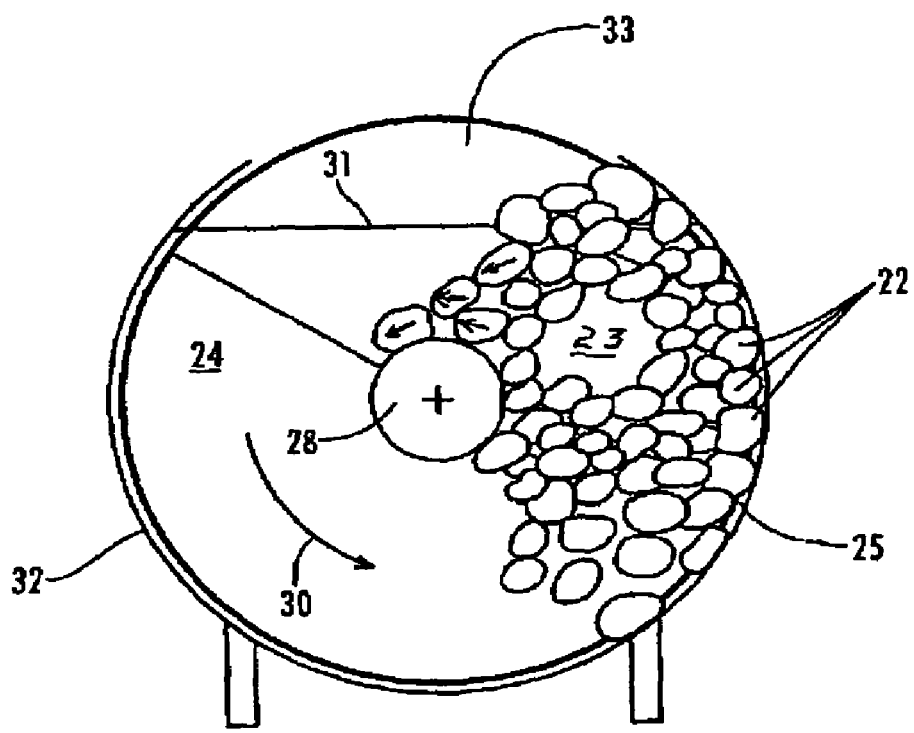
FIG. 2 is an end view of another prior art chiller showing a semi-cylindrical tank.
Figure 3:
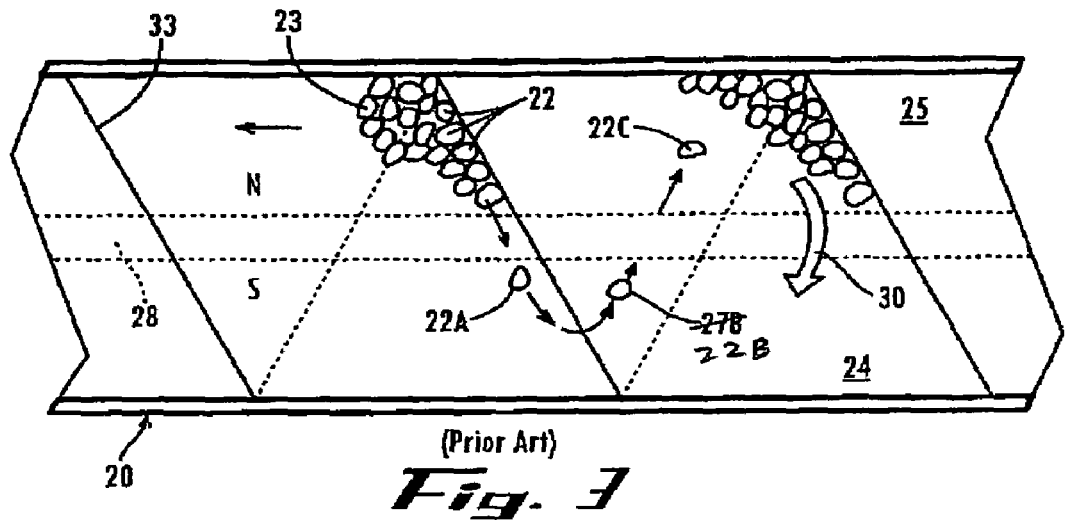
FIG. 3 is a plan view of a segment of a prior art chiller tank and its auger, with the movement of the birds crossing over the auger shaft illustrated.

As the lower portion of the masses of birds are redistributed laterally beneath the auger shaft, the buoyancy formerly provided from the now displaced birds to the birds above is removed so that the birds in the upper portion of the crowded side of the tank are freer to move downwardly under the influence of gravity. As shown by the birds 102 near the lower portion of the mass of birds that have the downward extending arrows, these birds tend to move downwardly as the birds above the waterline 68 apply their weight through force of gravity. This downward movement of the upper birds relieves the tendency of the birds from passing over the auger shaft 44 into the trailing flight of the auger, as illustrated in FIGS. 2 and 3.

In addition, the turbulence provided by the water stream 84 provides more surface contact of the chilled water with the surfaces of the birds being moved, thereby increasing the heat transfer from the birds. Moreover, the removal of the lower portion of the mass of birds from the crowded side of the tank provides more water contact to the birds above, thereby tending to increase the rate of heat transfer from these birds.

The foregoing poultry chiller has the ability to process more birds without increasing the hazard of the birds moving to a following auger flight, and has the ability to disperse the birds in the tank generally from the crowded side of the tank to the vacant side of the tank, and to tumble the birds more vigorously. This tends to remove any warmer boundary water from about the birds and provide more intimate contact of the colder moving water with the birds and therefore increase the rate of heat transfer from the birds. Also the exposure to water in a turbulent environment tends to allow the birds to pick up additional moisture.

The capacity of the chiller for birds is increased substantially over the prior art chillers with the same size footprint. For example, the chiller disclosed herein is capable of increasing the weight of birds processed in the chiller from approximately 700 lbs. of birds per linear foot of the tank to up to approximately 1000 lbs. per linear foot of tank for an 8-foot diameter tank.

In order to induce the displacement of the birds laterally from the crowded portion of the tank, beneath the auger shaft 44, to the dead portion 82 of the tank, the nozzles are directed laterally to the lower portions of the masses of the birds and the volume and velocity of the water in the streams must be sufficient to displace the birds. The volume and velocity of the water that functions adequately to displace the birds in an 8 foot diameter tank is over 100 gallons per minute, per nozzle, at 35 feet per second. For larger diameter tanks, the volume and velocity of the water streams may be increased. For example, for a 12-foot diameter tank, the volume and velocity of the water that functions adequately for displacing the birds is over 150 gpm per nozzle at 35 fps. Other volumes and velocities may be used as desired.

Some of the birds removed from the pulling side of the tank to the dead side of the tank by the water streams tend to return to the pulling side of the tank. However, since the water streams are introduced to the tank at several intervals along the tank, and since the birds are continuously advanced along the tank, the birds pass several water nozzles so that the return of the birds to the pulling side of the tank is retarded.

The former disadvantage of the birds being gathered together at the pulling side of the tank has been transformed into an advantage in that the predictable path of the birds on the pulling side of the tank is used to locate the nozzles that direct the streams of water against the birds. Should the birds tend to return to the more crowded side of the tank the repeated impingement of water against the birds at the several locations of the nozzles along the length of the tank is effective to assure that the birds do not overcrowd the pulling side of the tank and the birds are more vigorously washed by the streams of water.

In order to reduce the bacterial count of the birds, an antibacterial agent such as, but not limited to Chlorine ($Cl_2$), Sodium Hypochlorite (NaOCl), Calcium Hypochlorite ($Ca(OCl)_2$), and Chlorine Dioxide ($ClO_2$) is added to the water. By adding the antibacterial agent to the water that is to flow through the nozzles 70, the antibacterial is present in the optimum concentrations in the cold streams of water that impinge against the birds so the birds are generally washed and tumbled in the antibacterial water.

EXAMPLE

The auger chiller of a configuration as disclosed in the drawing was used for conducting temperature and bacterial testing. The tank was 55 feet long and had a diameter of 8 feet, and held approximately 14,000 gallons of liquid that included water and chlorine. The auger in the tank had 15 turns of 360 degrees and was rotated at 0.5 RPM's. The time that the birds were submerged in the tank while being advanced by the auger from one end of the tank to the other end was 31 minutes.

Chlorine was added to the streams of water 84 flowing into the chiller at concentrations not exceeding 5 parts free chlorine to one million parts water. The temperature of the water was maintained at between 32.5 degrees F. and 33.5 degrees F. at the end of the tank where the water was recirculated into the tank, and between 34.5 degrees F. and 36 degrees F. at the end of the tank where the water was recirculated from the tank.

The birds being chilled in the tank were whole chickens ranging from 4.2 pounds to 9.5 pounds, and were defeathered, decapitated, legs removed to the hocks, and eviscerated.

Two series of bacteria tests were conducted on the birds in the chiller. In both series of tests, birds were tested for *salmonella* on five consecutive days at the rate of 12 birds per day for a total of 60 birds in each test. In the first test, the streams of water and chlorine 84 of the auger chiller system was turned on and in the second test it was turned off.

*Salmonella* was detected on 1 out of 60 birds or 1.67% in the first test and on 5 out of 60 or 8.33% in the second test.

Figure 7:
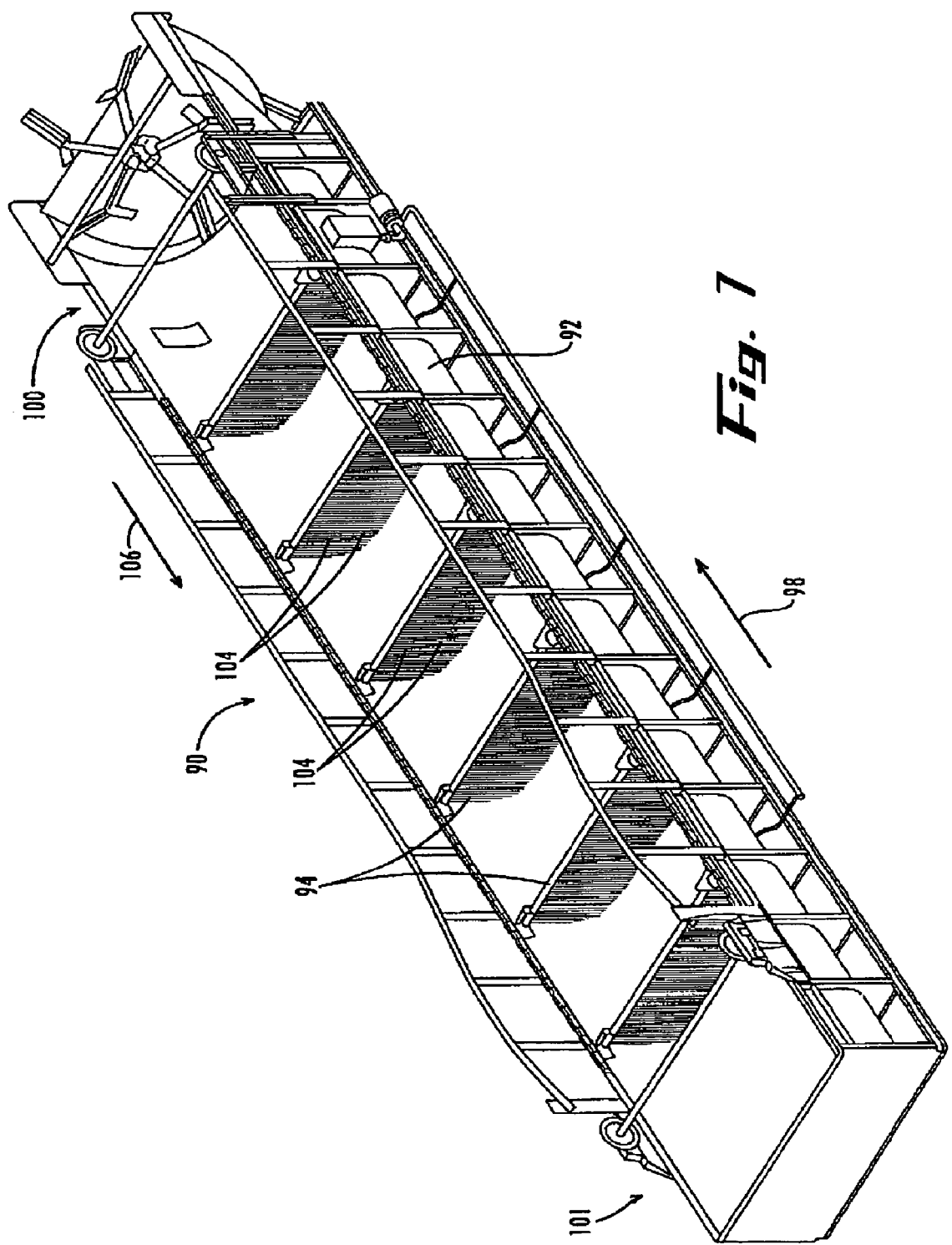
FIG. 7 is a perspective view of a drag chiller.

FIG. 7 shows a drag chiller for chilling poultry and other edible products. The drag chiller 90 includes a tank 92 that is open at its top and has opposed side walls and a bottom wall that form a generally rectangular interior with curved lower corners. A series of paddles 94 are supported on an endless conveyor system 96, with the paddles being suspended downwardly into the confines of the chiller tank 92. The paddles are equally spaced along the conveyor system. Water is introduced at the first end 100 of the chiller tank and moves toward the second end 101. In the meantime, birds 102 are introduced at the second end of the tank 101 and moved toward the first end of the tank under the influence of the movement of the paddles 94 in the direction indicated by arrow 98.

In this embodiment of the invention, the paddles 94 are formed with a series of spaced, parallel, vertically oriented bars 104. The bars are spaced apart a distance small enough so as to prevent birds from passing between the bars or becoming lodged in the bars but are spaced apart far enough so as to permit the water of the chiller to pass between the bars.

Figure 9:
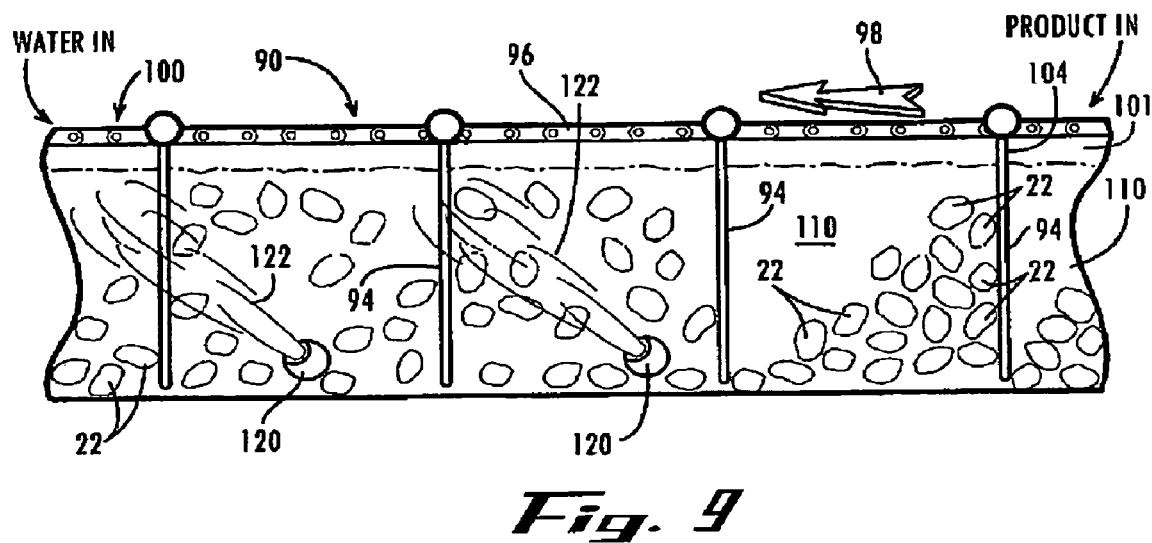
FIG. 9 is a side cross sectional view of the drag chiller of FIGS. 7 and 8, showing the angles of the streams of water and the movement of the birds impinged by the streams and the distribution of the birds.

As previously described, as the paddles 94 move in the direction as indicated by arrow 98 and the water moves in the opposite direction 106, the birds 102 tend to contact the forward facing surfaces of the paddles and tend to accumulate at the forward facing surfaces of the paddles. This leaves large spaces between paddles that are not occupied by birds. This is indicated on the right side of FIG. 9 of the drawings. This leaves a rather large volume of water 110 spaced forwardly of the paddles and the accumulation of birds against the paddles.

Figure 8:
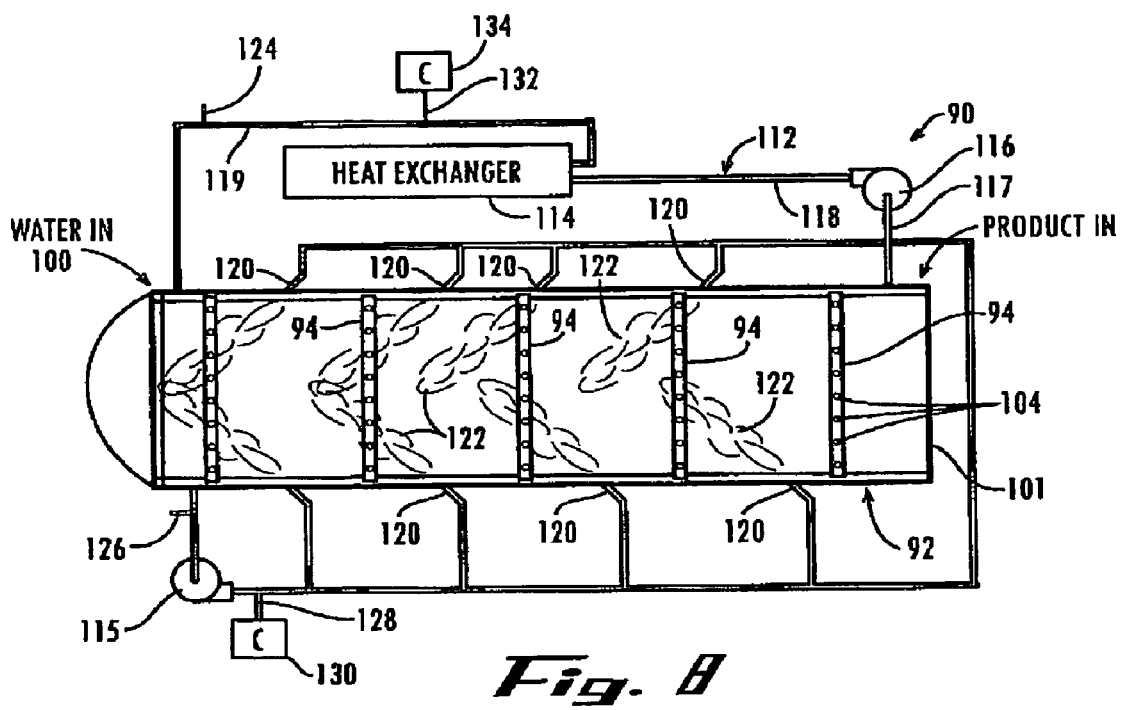
FIG. 8 is a plan view of the drag chiller of FIG. 7, showing its water circulation system and the angles of the streams of water in the chiller.

As shown in FIG. 8, the recirculation system 112 includes a heat exchanger 114 and a recirculation pump 116 that communicate with the conduits 117, 118, and 119 to recirculate the water of the tank from the second end 101 to the first end 100 of the tank. The heat exchanger reduces the temperature of the water to the desired range of temperatures.

A water jet circulation pump 115 draws colder water from the first end 100 of the chiller tank and directs the colder water through the water jets 120, through the lower side wall of the chiller tank 92. The water streams 122 emitted from the water jets 120 are directed at an upwardly and inwardly sloped angle from the lower side walls of the tank, sloped in the direction of movement of the paddles 94. Since the paddles are formed of parallel bars, they are porous to the water and the water streams 122 tend to pass through the bars of the paddles to engage the birds 102 that have accumulated in front of the paddles. This engagement of the water streams against the birds tends to move the birds away from the paddles and out into the space ahead of the paddles where more volume of water is available.

It will be noted that since the streams of water 122 are angled forwardly and upwardly, as a paddle passes a water jet 120, the streams tend to first pass through the lower corner of the paddle and as the paddle moves farther on, the streams are directed more toward the center line of the paddle and higher on the surface of the paddle to pass through the paddle. This tends to have the streams of water pass through most of the cross sectional area of the paddles and assure that most of the birds will be directly contacted by the water streams, and moved and tumbled away from the paddles. Even in those instances where the birds are not actually moved and tumbled away from the paddles, they are likely to be engaged by the water streams so that the anti-bacterial additive in the water, as well as the cold water, will engage and wash the facing surfaces of the birds.

The placement, angles and numbers of the water jets described above may be changed as considered desirable for each chiller tank.

In the event that makeup water is to be added to the water in the chiller tank 92, there are two sources of makeup water. The first source is the makeup water conduit 124 that is in communication with the water recirculated through the heat exchanger 114, and the other is the makeup water conduit 126 that is in communication with the water jet circulation pump 115.

It will be noted that the inlet to the water jet circulation pump 115 is normally in communication with the water inlet end 100 of the tank. This means that the coldest and likely the freshest water available in the recirculated water system will be used to move through the water jets 120 to form the water streams 122 that engage the birds. However, there is a branch conduit 128 that communicates with the discharge from the water jet circulation pump 115 that also communicates with a source of anti-bacterial liquid 130, such as a source of chlorine that is added to the water moving from the water jet circulation pump to the water jets 120. This adds the additional chlorine or other anti-bacterial additive to the cold water streams that will eventually engage the birds in the chiller tank.

Likewise, an additional branch conduit 132 can be used to inject chlorine from a chlorine source 134 to the water moving away from the heat exchanger as the water is being recirculated to the water inlet end of the tank 100 and near the intake 126 of the jet system.

While the terms "bird" and "poultry" have been used herein, these terms should be construed as including other products, including dressed animals prepared for human consumption that can be treated in the disclosed chiller, as may be desired.

The paddles of the drag chiller and the auger of the auger chiller both function as bird moving means for advancing the birds in the tank along a predetermined path. Other types of bird moving means may be used as desired.

Although a preferred embodiment of the invention as used with an auger-type poultry chiller has been disclosed in detail herein, it will be obvious to those skilled in the art that variations and modifications of the disclosed embodiment can be made without departing from the spirit and scope of the invention as set forth in the following claims.

What is claimed is:

1. A chiller for reducing the temperature and reducing bacteria of harvested birds, comprising:
    an elongated tank configured for holding tank water and for receiving birds in the tank water,
    bird moving means in said tank for moving birds in a first direction along the length of the tank in a predetermined path through the tank water,
    a water circulation system in communication with said tank for chilling the tank water and recirculating tank water through said tank in a counter flow direction with respect to the birds as the birds move in the first direction,
    at least one nozzle positioned for directing a stream of water into the tank water and toward the predetermined path to impinge against the birds in the predetermined path and disperse at least some of the birds from the predetermined path, and an anti-bacterial mixing means for adding predetermined amounts of anti-bacterial substance to the stream of water that moves through said nozzle and toward the birds in the tank, such that the stream of water tends to wash the birds with the antibacterial substance.

2. The chiller of claim 1 wherein said nozzle comprises a plurality of nozzles positioned at intervals along the length of the tank.

3. The chiller of claim 1, wherein said anti-bacterial mixing means includes a supply of antibacterial liquid and a pump for injecting the antibacterial liquid into the streams of water.

4. The chiller of claim 1, wherein said antibacterial mixing means is configured for adding antibacterial agents into the stream of water at optimum levels for bacterial reduction.

5. The chiller of claim 1, wherein said bird moving means comprises an auger having an auger shaft and series of auger flights, and said nozzle is oriented to direct the stream of water laterally across said tank and beneath the auger shaft.

6. The chiller of claim 5, wherein said at least one nozzle comprises a plurality of nozzles spaced along the length of said tank on one side of the tank.

7. The chiller of claim 1, wherein said bird moving means comprises a series of open mesh paddles, and said nozzle is oriented to direct the stream of water through the paddles.

8. The chiller of claim 7, wherein said at least one nozzle comprises a plurality of nozzles spaced along the length of said tank.

9. A method for reducing the temperature of birds, comprising depositing a plurality of birds in an elongated tank filled with water, reducing the temperature of the water in the tank, urging birds through the water and along the tank, tending to accumulate the birds in a predetermined path as the birds are urged through the water and along the tank, directing a stream of water toward the predetermined path and about the birds as the birds move along the predetermined path and dispersing at least some of the birds with the stream of water toward where there are fewer birds and creating water turbulence about the birds, and adding an antibacterial liquid to the stream of water such that the antibacterial liquid impinges against the birds for reducing the bacteria count of the birds.

10. The method of claim 9, wherein the step of directing a stream of water into the tank comprises directing a plurality of streams of water into the tank at spaced positions along the length of the tank.

11. The method of claim 9, wherein the step of directing the stream of water into the birds includes the step of directing the stream of water below the water level.

12. The method of claim 9, and wherein the step of urging the birds through the water comprises moving the birds with a series of open face paddles through the water, and the step of directing a stream of chilled water toward the predetermined path comprises directing the stream of water through the paddles.

13. A chiller for reducing the temperature of birds comprising:

an elongated tank, an auger in said tank, said auger having an auger shaft parallel to the length of said tank and a helical blade having auger flights extending about said auger shaft, said auger flights each having a helical surface such that when the tank is filled with water and birds are placed in the water and the auger is rotated, the helical surface of each said auger flight moves downwardly on a dead side of said tank and upwardly on a pulling side of said tank and tends to advance and lift the birds in the water along the pulling side of said tank such that some of the birds tend to move laterally beneath said auger shaft from said dead side of said tank to the pulling side of said tank and move along a predetermined path in the pulling side of the tank at the level of the water, a series of nozzles positioned at said side wall on said pulling side of said tank and oriented for directing a stream of water laterally into the water in said tank from said pulling side of said tank and below said auger shaft and toward said dead side of said tank to engage the birds in the predetermined path and remove some of the birds from the birds in the predetermined path, and an antibacterial mixing system for adding antibacterial liquid to the stream of water, such that the birds moving along the predetermined path are washed by the stream of water in a mixture of the water and the antibacterial liquid.

14. The chiller of claim 13, wherein said nozzles are configured to recirculate chilled water in said tank.

15. The chiller of claim 13, wherein said nozzles are spaced along the length of said tank, such that the birds are moved progressively from nozzle-to-nozzle.

16. A chiller for reducing the temperature of buoyant birds comprising:

an elongated tank having a side wall for containing chilled water, an auger in said tank having an auger shaft parallel to the length of said tank and a helical blade having auger flights extending about said auger shaft toward said side wall for moving the birds along a processing path through the chilled water in said tank, at least one nozzle positioned at said side wall of said tank oriented for directing a stream of water laterally through the processing path and beneath said auger shaft from one lateral side of said auger shaft to the other lateral side of said auger shaft to move the birds through the water laterally beneath the auger shaft, and means for moving a mixture of antibacterial liquid and water though said nozzle, such that the stream of water and antibacterial liquid impinges against the birds moving along the processing path and washes the birds with the antibacterial liquid and urges the birds away from the processing path.

17. The chiller of claim 16, wherein said nozzle is configured to recirculate chilled water in said tank.

18. The chiller of claim 16, wherein said tank has a dead side on one lateral side of said auger shaft and a pulling side on the other side of said auger shaft such that the auger moves birds from the dead side to the pulling side and advances the birds along said pulling side of the tank and masses the birds at the water level on said pulling side in the processing path, said nozzle comprises a plurality of nozzles spaced along said pulling side of said tank and is oriented to direct streams of water from said pulling side to the dead side of said tank and move birds to the dead side of said tank.

19. A chiller for reducing the temperature of birds comprising:

an elongated tank for containing chilled water and birds placed in the water, a series of paddles in said tank and movable along said tank, said paddles having an open surface for pushing birds along said tank and allowing water to pass through said paddles as said paddles move the birds along the length of said tank, a series of nozzles positioned along said tank and oriented for directing streams of water into the water in said tank and through said paddles as said paddles move along the length of said tank, an antibacterial mixing system for adding antibacterial liquid to the streams of water, such that the birds moving along the tank at the surface of the paddles are washed by the streams of water in a mixture of the water and the antibacterial liquid.

* * * * *